US009567922B2

(12) United States Patent
Löfgren

(10) Patent No.: US 9,567,922 B2
(45) Date of Patent: Feb. 14, 2017

(54) HYBRID SYSTEM COMPRISING A SUPERCHARGING SYSTEM AND METHOD FOR OPERATION

(75) Inventor: Isak Löfgren, Särö (SE)

(73) Assignee: KASI TECHNOLOGIES AB, Smedjebacken (SE)

( * ) Notice: Subject to any disclaimer, the term of this patent is extended or adjusted under 35 U.S.C. 154(b) by 340 days.

(21) Appl. No.: 14/131,208

(22) PCT Filed: Jun. 28, 2012

(86) PCT No.: PCT/EP2012/062618
§ 371 (c)(1),
(2), (4) Date: Jan. 15, 2014

(87) PCT Pub. No.: WO2013/004595
PCT Pub. Date: Jan. 10, 2013

(65) Prior Publication Data
US 2015/0361905 A1 Dec. 17, 2015

Related U.S. Application Data

(60) Provisional application No. 61/505,274, filed on Jul. 7, 2011.

(51) Int. Cl.
F02B 33/44 (2006.01)
F02B 33/00 (2006.01)
(Continued)

(52) U.S. Cl.
CPC ............ F02D 41/0007 (2013.01); B60K 6/24 (2013.01); B60K 6/485 (2013.01); B60L 11/14 (2013.01);
(Continued)

(58) Field of Classification Search
CPC ....... F02D 41/0007; B60K 6/24; B60K 6/485; B60K 2025/005; B60L 11/14; B60W 10/02; B60W 10/30; B60W 20/00; F02B 33/40; F02B 37/013; F02B 37/10; F02B 39/10; F02B 39/12; F02N 11/04; F02N 11/003; B60Y 2400/206; B60Y 2400/44; Y02T 10/144; Y02T 10/6226; Y02T 10/6295; Y02T 10/70; Y02T 10/7077
(Continued)

(56) References Cited

U.S. PATENT DOCUMENTS 2,585,029 A * 2/1952 Nettel ............... F02B 37/11
290/4 R
5,771,695 A * 6/1998 Halimi ............... F02B 39/10
60/608
(Continued)

FOREIGN PATENT DOCUMENTS

DE WO 2010066452 A1 * 6/2010 ............. F02B 39/04
EP 2042705 4/2009
(Continued)

OTHER PUBLICATIONS

Machine Translation to Patent Publication No. WO 2005124121 A1, Duesmann, published on Dec. 29, 2005.*
(Continued)

Primary Examiner — Thai Ba Trieu
(74) Attorney, Agent, or Firm — Babcock IP, PLLC

(57) ABSTRACT

The present invention relates to a hybrid system comprising a supercharging system for an internal combustion engine (1), the hybrid system comprising: a charging device (6) with a turbine (7) connected to a compressor (8) via a compressor shaft (9), the compressor having a high speed shaft (30); a planetary gear (25) coupled between the high speed shaft (30) and an electric motor/generator (20); a clutch (18a); and a power transmission for connecting a crank shaft (4) of the combustion engine (1) to the electric motor/generator (20) via the clutch (18a); wherein the
(Continued)

hybrid system further comprises a system control (23) configured to operate the hybrid system in different operating modes according to a control sequence based on one, or a plurality of, input parameters representative of operational properties of the hybrid system.

27 Claims, 4 Drawing Sheets

(51) Int. Cl.

| | | |
|---|---|---|
| *B60K 1/00* | (2006.01) | |
| *B60K 6/20* | (2007.10) | |
| *B60K 6/485* | (2007.10) | |
| *F02D 41/00* | (2006.01) | |
| *B60K 6/24* | (2007.10) | |
| *B60W 10/02* | (2006.01) | |
| *B60W 10/30* | (2006.01) | |
| *B60W 20/00* | (2016.01) | |
| *F02B 37/013* | (2006.01) | |
| *F02B 39/10* | (2006.01) | |
| *F02B 39/12* | (2006.01) | |
| *F02B 33/40* | (2006.01) | |
| *F02B 37/10* | (2006.01) | |
| *F02N 11/04* | (2006.01) | |
| *B60L 11/14* | (2006.01) | |
| *B60K 25/00* | (2006.01) | |
| *F02N 11/00* | (2006.01) | |

(52) U.S. Cl.
CPC .............. *B60W 10/02* (2013.01); *B60W 10/30* (2013.01); *B60W 20/00* (2013.01); *F02B 33/40* (2013.01); *F02B 37/013* (2013.01); *F02B 37/10* (2013.01); *F02B 39/10* (2013.01); *F02B 39/12* (2013.01); *F02N 11/04* (2013.01); *B60K 2025/005* (2013.01); *B60Y 2400/206* (2013.01); *B60Y 2400/44* (2013.01); *F02N 11/003* (2013.01); *Y02T 10/144* (2013.01); *Y02T 10/6226* (2013.01); *Y02T 10/6295* (2013.01); *Y02T 10/70* (2013.01); *Y02T 10/7077* (2013.01)

(58) Field of Classification Search
USPC .... 60/607–608, 612; 123/559.1, 559.3, 562; 180/65.1–65.2, 65.25–65.26
See application file for complete search history.

(56) References Cited

U.S. PATENT DOCUMENTS

| | | | | |
|---|---|---|---|---|
| 7,174,977 | B2* | 2/2007 | Enjoji ............... | B60L 1/003 180/65.1 |
| 8,225,608 | B2* | 7/2012 | Wu .................. | F02B 39/10 60/607 |
| 8,397,501 | B2* | 3/2013 | Barker ............. | F02B 39/10 60/608 |
| 8,490,393 | B2* | 7/2013 | Lofgren ........... | F02B 39/10 60/608 |
| 8,490,394 | B2* | 7/2013 | Lofgren ........... | F02B 39/10 60/608 |
| 8,522,550 | B2* | 9/2013 | Lofgren ........... | F02B 39/10 60/608 |
| 8,528,330 | B2* | 9/2013 | Lofgren ........... | F02B 39/10 60/608 |
| 8,528,331 | B2* | 9/2013 | Lofgren ........... | F02B 39/10 60/608 |
| 8,740,746 | B2* | 6/2014 | Figler ............... | F02B 39/04 60/598 |
| 8,959,912 | B2* | 2/2015 | Hoess .............. | F02B 39/10 60/608 |
| 2010/0044127 | A1 | 2/2010 | Sartre | |
| 2010/0083655 | A1* | 4/2010 | Frederick ......... | F02B 39/04 60/608 |
| 2010/0107632 | A1 | 5/2010 | Wu | |
| 2012/0137681 | A1* | 6/2012 | Hoess .............. | F02B 39/10 60/607 |
| 2013/0269342 | A1* | 10/2013 | Oh .................. | F02B 39/10 60/607 |
| 2014/0026564 | A1* | 1/2014 | Jacobson ......... | F02B 39/06 60/608 |
| 2015/0066272 | A1* | 3/2015 | Benjey ............ | F02B 33/34 180/65.26 |
| 2015/0176481 | A1* | 6/2015 | Jaeger ............. | F02B 39/10 60/608 |

FOREIGN PATENT DOCUMENTS

| | | |
|---|---|---|
| WO | WO2005124121 | 12/2005 |
| WO | WO2008075130 | 6/2008 |
| WO | WO2009014488 | 1/2009 |
| WO | WO2011009693 | 1/2011 |

OTHER PUBLICATIONS

International Search Report for application PCT/EP2012/062618, Nov. 28, 2012, Rijswijk NL.

* cited by examiner

HYBRID SYSTEM COMPRISING A SUPERCHARGING SYSTEM AND METHOD FOR OPERATION

FIELD OF THE INVENTION

The present invention relates to a hybrid system comprising a supercharging system for an internal combustion engine, a method for operating a hybrid system for propulsion of a vehicle comprising an internal combustion engine, a two-stage supercharging system for an internal combustion engine, and a method for operating a two-stage supercharging system. Furthermore, the present invention relates to a control sequence, or method, and a mode selector control sequence for a hybrid system including an exhaust gas propelled turbo supercharging system, a mechanical supercharging system and an electrical supercharging/regenerating system.

The present invention further relates to supercharging and hybrid systems, and method of operation and controlling those systems, which systems comprise turbine(s), compressor(s), and electric system(s) comprising an electrical motor/generator being operatively connected to e.g. at least one of the compressors, and/or operatively connected by a power transmission system to a crank shaft, or any other propelling shaft, of an internal combustion engine.

BACKGROUND ART

In the field of automotive industry, much resources are and have been allocated towards developing systems for improving the efficiency of motive, or propulsion, systems by e.g. reducing the overall fuel consumption of internal combustion engines and propulsion systems comprising internal combustion engines.

Reduced fuel consumption has e.g. been achieved by providing supercharging systems, wherein a compressor is used for forced induction of an internal combustion engine. In more detail, intake manifold pressure is increased in order to decrease internal pumping and throttling losses which, in turn, allows for decreased fuel consumption. Such a system further enables downsizing of a vehicle engine without substantially interfering with the vehicle, and vehicle engine performance requirements. An example of a supercharging system is described in the published WO 2009/014488.

Turbo charging systems are known and defined in a flow and pressure range by the compressor and turbine characteristics in combination. However, turbo charging systems of today are in need of further improvement in terms of e.g. providing further reduced energy consumption as well as increasing the number of features of the turbo charging system.

SUMMARY OF THE INVENTION

In view of the above-mentioned and other drawbacks of the prior art, a general object of the present invention is to provide a more efficient supercharging system which allows for improvements in flexibility of running the supercharging system.

A further object of the present invention is to provide an improved and more efficient hybrid drive system for propelling a vehicle comprising an internal combustion engine, which hybrid drive system comprises a supercharging system.

These and other objects are met by the subject matters provided in the independent claims. Preferred embodiments of the invention are presented in the dependent claims.

According to a first aspect thereof, the present invention relates to a hybrid system comprising a supercharging system for an internal combustion engine, the hybrid system comprising a charging device with a turbine connected to a compressor via a compressor shaft, the compressor having a high speed shaft; a planetary gear coupled between the high speed shaft and an electric motor/generator; a clutch; and a power transmission for connecting a crank shaft of the combustion engine to the electric motor/generator via the clutch; wherein the hybrid system further comprises a system control configured to operate the hybrid system in different operating modes according to a control sequence based on one, or a plurality of, input parameters representative of operational properties of the hybrid system.

The invention is based on the realization that improvements in the hybrid system can be achieved by providing a control unit enabling the hybrid system to operate in different modes. Hereby, existing hybrid systems can be made more cost efficient by integrating the supercharging system into the hybrid system and depending on e.g. the specific driving scenario, a specific mode may be utilized by the hybrid system in order to improve, for example, capacity utilization of the hybrid system and hence reduce energy consumption of the vehicle to which the hybrid system is associated with. The modes may, for example, be to start-up the internal combustion engine by means of the electric motor, to propel the vehicle by means of the electric motor, which may be especially advantageous in situations including frequent start-stop situations, to propel the vehicle by means of both the electric motor and the internal combustion engine in order to reduce fuel consumption of the internal combustion engine. As a further example, one mode may include regeneration of electric energy to the electric motor by means of brake energy in a situation where the vehicle is in retardation. Other modes are of course conceivable and will be described further below in relation to the different operating modes.

Moreover, the hybrid system according to the present invention may utilize various embodiments of a supercharging system for realizing an improved and more efficient hybrid drive system, wherein e.g. overflow energy from exhaust gas and/or mechanical power of the motive shaft from the internal combustion engine, such as braking power generated during braking of the vehicle, may be converted to electric power which, in turn, may be utilized and stored in order to e.g. provide motive power to the vehicle with the electric motor. Furthermore, the electric motor of the hybrid system may be advantageously utilized in combination with the internal combustion engine and auxiliary loads thereof. Advantageous operational modes of various embodiments of the hybrid drive system are described below.

Furthermore, the hybrid system according to the present invention may advantageously realize an improved supercharging system for an internal combustion engine, which hybrid system combines and enables exhaust gas driven, electrical motor driven and mechanically driven supercharging, and which system also allows for regeneration of energy by e.g. converting overflow energy from the exhaust gases, and/or overflow rotational energy from the internal combustion engine, or braking, to electric energy by utilizing the electric motor as a generator, wherein the electric energy may be stored in a battery, such as a battery pack of a vehicle hybrid drive system.

For example, the supercharging system comprised in the hybrid system is an exhaust gas propelled turbo charging system, wherein the charging device is an exhaust gas propelled turbo charging device comprising a turbine and a compressor. Furthermore, the charging device may form a first stage turbo charging device for the internal combustion engine. Moreover, the system control may be incorporated in a vehicle electric control unit, ECU.

According to an exemplifying embodiment, the electric motor/generator, is arranged along a common axis with the compressor shaft and the high speed shaft, wherein a rotor member of the electric motor/generator is connected to a first input of the planetary gear, and the high speed shaft is connected to a second input of the planetary gear, such that the planetary gear enables suitable transmission, or gear reduction, between the operational rotational speed of the charging device and the operational rotational speed of the rotor member of the electric motor/generator.

The transmission of the planetary gear may e.g. be arranged to function based on gear cooperation between e.g. sun, ring, and planet gear devices, or by traction cooperation between e.g. sun, ring, and planet wheel devices.

According to an exemplifying embodiment of the hybrid system, the clutch is a first clutch and wherein the hybrid system further comprises a second clutch; wherein the planetary gear is coupled to the electric motor/generator via the second clutch. Hence, the electric motor/generator is connectable and disconnectable from operative engagement with the planetary gear.

Hereby, the second clutch may connect and disconnect the electric motor/generator from the planetary gear. It may be advantageous to disconnect the electric motor/generator from the planetary gear when, for example, the ignition is off in a petrol driven vehicle, when oil pressure in the supercharging system is low and the supercharging system is about to build up pressure, or in a start up procedure where idle speed is not completely stabilized. Accordingly, when starting the vehicle, it may be advantageous to disconnect the electric motor/generator from the planetary gear. Further features and advantages of disconnecting the second clutch is further described below.

Moreover, according to an exemplifying embodiment, the hybrid system further comprises a third clutch for connecting the power transmission to the crank shaft of the combustion engine. Hence, the power transmission is connectable and disconnectable from operative engagement with the crankshaft, or similar motive shaft, of the combustion engine during operation of the hybrid system during different operational modes.

By providing a third clutch which may connect and disconnect the power transmission to the crank shaft of the combustion engine, the hybrid system may be configured to drive auxiliary loads at, for example, stand still when the combustion engine is turned off. Accordingly, the electric motor/generator may when the combustion engine is shut off drive e.g. air condition, infotainment systems, etc.

According to an exemplifying embodiment of the hybrid system, the plurality of operating modes comprises:

an operating mode A where the electrical motor drive auxiliary loads of the internal combustion engine, for example at vehicle stand-still (internal combustion engine shut-off);

an operating mode B where the electric motor starts the internal combustion engine, from engine shut-off;

an operating mode C where the electric motor propels the vehicle, for example by its own only or by providing motive power together with the internal combustion engine or other vehicle propelling device/motor; and an operating mode D where brake energy from retardation of the vehicle is regenerated to electrical energy.

For example, in operating mode A, the electrical motor/generator is, as described above, arranged to drive auxiliary loads by being mechanically connected to an auxiliary drive belt, or the electrical motor/generator is arranged for generating electrical power for driving electrically driven auxiliary devices. Moreover, when the electric motor starts the combustion engine according to the operating mode B, the above described first and third clutches are engaged while the second clutch is disengaged. The various states of the first, second and third clutches for the different operating modes will be described and illustrated further below.

According to an exemplifying embodiment of the hybrid system, the plurality of operating modes comprises:

an operating mode E where exhaust gas energy is regenerated to electrical energy;

an operating mode F where exhaust gas energy is regenerated to mechanical energy;

an operating mode G comprising electrically driven supercharging of the internal combustion engine; and an operating mode H comprising mechanically driven supercharging of the internal combustion engine;

According to an exemplifying embodiment of the hybrid system, the system control comprises a mode selecting subsystem arranged to select an operating mode of the hybrid system based the input parameters according to a mode selector algorithm. Hence, a suitable operation mode of the hybrid system may be selected.

Furthermore, according to an exemplifying embodiment of the hybrid system, the system control comprises a mode controlling subsystem arranged to control the hybrid system based on the selected operating mode and the input parameters according to a mode control sequence.

According to an exemplifying embodiment of the hybrid system, the mode control sequence comprises engaging or disengaging the first (18a), second (18b) and third (18c) clutches, operating the electric motor in drive mode or generate mode, based on the selected operating mode (Mode) according to the following:

| Mode: | 18a | 18b | 18c | 20 |
|---|---|---|---|---|
| A | Engaged | Disseng. | Disseng. | Drive |
| B | Engaged | Disseng. | Engaged | Drive |
| C | Engaged | N/A | Engaged | Drive |
| D | Engaged | N/A | Engaged. | Generate | wherein N/A denotes not applicable non-limiting features, or alternatives, which typically do not form part of the current embodiment, or protective scope.

According to an exemplifying embodiment of the hybrid system, the mode control sequence comprises engaging or disengaging the first (18a), second (18b) and third (18c) clutches, operating the electric motor (20) in drive mode or generate mode, opening or closing an air by-pass valve (21), and opening or closing a waste gate (22) based on the selected operating mode (Mode) according to the following:

| Mode: | 18a | 18b | 18c | 20 | 21 | 22 |
|---|---|---|---|---|---|---|
| E | N/A | Engaged | N/A | Generate | N/A | N/A |
| F | Engaged | Engaged | Engaged | Generate | N/A | N/A |
| G | Disseng. | Engaged | Engaged | Drive | Closed | N/A |
| H | Engaged | Engaged | Engaged | N/A | Closed | N/A |

According to an exemplifying embodiment of the hybrid system, it further comprises an engine control and/or a vehicle control arranged to determined a first vehicle parameter representative of engine rpm and/or derivatives thereof, a second vehicle parameter representative of an engine throttle position and/or derivatives thereof, and a third vehicle parameter representative of a driver pedal position and/or derivatives thereof, wherein the system control is arranged to control the hybrid system based on the first, second and third vehicle parameters. For example, the vehicle parameters are sent between the system controls and system component sensors via a communication network, such as a CAN-bus network. Accordingly, the system control is coupled to the engine control and the vehicle control, respectively.

According to an exemplifying embodiment of the hybrid system, it further comprises a battery operatively coupled to the electric motor/generator; wherein the system control is configured to:

determine a change of the driver pedal position;
close the air by-pass valves;
determine threshold state-of-charge (SOC) value of the battery; and/or
determine available electric power by comparing battery state-of-charge (SOC) with the predetermined threshold SOC-value.

According to an exemplifying embodiment of the hybrid system, if the battery state-of-charge is above the threshold SOC-value, the system control is configured to operate the electric motor in drive mode to generate supercharging until a reference pressure and/or mass flow (p3) is obtained.

According to an exemplifying embodiment of the hybrid system, the electric motor/generator may comprise a sensor configured to monitor actual (real-time) turbo speed without having a turbo speed sensor. This may for example be achieved by calculations of electric motor/generator sensor parameter values compensated, or multiplied, with the planetary gear ratio. Furthermore, for gears/transmissions, such as traction drives or variable transmission gear sets, a slip coefficient may be added to the calculations in order to provide a more correct turbo speed measurement.

According to an exemplifying embodiment of the hybrid system, the charging device comprises a variable nozzle turbine (VNT), the variable nozzle turbine being controlled by determining an error value of a blade speed ratio, BSR(error), defined by a difference in a measured blade speed ratio, BSR(real) and a desired blade speed ratio BSR(desired).

By providing a variable nozzle turbine (VNT), the charging efficiency and operation of the supercharging system may be further improved during different operational conditions and modes of the hybrid system. Accordingly, the variable nozzle turbine is controlled to provide for substantially optimum turbine efficiency.

For example, according to an exemplifying embodiment of the hybrid system, the charging device comprises at least one variable nozzle turbine vane.

A variable nozzle turbine, and/or a turbine with a variable nozzle vane(s), allow for the possibility of controlling the turbine while maintaining high operational efficiency. For example, the turbine vanes may be rotated such that that the effective area of the vanes and, thus, the effective mass flow of, or through, the turbine for a given pressure ratio may be improved. For example, the turbine operation may be improved by adjusting the variable nozzle in relation to a blade speed ratio (BSR) parameter value, which is used to describe the efficiency of a turbine. A BSR value may e.g. be defined as $$BSR = \frac{w_t r_t}{\sqrt{2 c_p T_{03}\left(1 - \Pi_t^{\gamma e - 1 / \gamma e}\right)}}$$

as, e.g. defined in Watson and Janota, 1982, p. 152, wherein $w_t$ is turbine speed, $r_t$ is turbine radius, $c_p$ is turbine specific heat transfer constant, $T_{03}$ is turbine inlet temperature, $\Pi_t$ is the turbine pressure ratio, which may be defined as the pressure after divided by the pressure before the turbine, and $\gamma$ is ratio of specific heats. The definition of the BSR parameter, however, is not limited to the above exemplifying example. Other definition of the BSR parameter may be obtained through use of ideal gas law and other developed laws (equations) of thermodynamics.

According to an exemplifying embodiment, during operation, the VNT is controlled by determining an error value BSR(error) which may be defined as the difference between a measured real value BSR(real), determined by measurement of, among other, turbo speed in the manner described above with the use of electric motor/generator sensor and calculation based on design parameters within the included planetary gear set, and a desired value BSR(desired) for substantially optimum turbine efficiency, according to the following:

BSR(error)=BSR(desired)−BSR(real)

wherein the error value is used for adjusting the variable nozzle(s) to improve or obtain optimum turbine efficiency at a specific turbine operating condition. For example, the error value is inputted into a VNT-regulator, such as a PID-regulator, and/or a closed loop regulator system, which may be integrated in the system control. Suitable parameter values which are desired under differing operational conditions and operational modes may e.g. be stored locally or remotely on a memory device accessible by the system control. Desired parameter values may also be determined using algorithm configured to output suitable parameter values based on operational parameters values associated with the supercharging system, the internal combustion engine, and/or the vehicle.

For example, according to an exemplifying embodiment, the variable nozzle turbine vane is arranged to adjust turbine efficiency of the charging device based on sensor signal from the electric motor and/or an engine control. According to an exemplifying embodiment, the hybrid system comprises a system control including a control sequence to control at least one actuator of the variable nozzle turbine vane, or vanes.

According to an example embodiment of the hybrid system, the charging device is a first charging device with a first turbine connected to a first compressor via a first compressor shaft, and wherein the hybrid system further comprises a second turbo charging device with a second turbine connected to a second compressor via a second compressor shaft.

Hereby, improved matching between the first and second charging devices of the hybrid system may be realized by enabling controlling of the pressure build-up of the first charging device in relation to the second charging device, such that more efficient and improved charging pressure and/or mass flow of the system is maintained during switch-over operation between the first and second charging devices. In particular, the controlling of the pressure and/or mass flow build-up of the first charging device is advantageously achieved by the electric motor, e.g. a combined electric motor/generator, which is operatively connected to the first charging device via the planetary gear and which electric motor/generator enables measuring and actively controlling the operation, such as the rotational speed of the turbine and compressor of the first charging device. Hence, undesired and inefficient dips in pressure and/or mass flow build up, and, in turn, dips in engine torque may advantageously be avoided.

For example, the supercharging system is an exhaust gas propelled turbo charging system as described above, wherein each one of the first and second charging devices is an exhaust gas propelled turbo charging device comprising a turbine and a compressor. Furthermore, the first charging device may, as also described above, form a first stage turbo charging device for the internal combustion engine and the second charging device may form a second stage turbo charging device for the internal combustion engine. Vice versa, the second charging device may form the first stage turbo charging device and the first charging device may form a second stage turbo charging device for the internal combustion engine. Alternatively, or optionally, the first and second charging devices may be arranged in a parallel configuration.

According to an exemplifying embodiment of the hybrid system, the plurality of operating modes comprises:
an operating mode I wherein the first turbo charging device drives the supercharging in a single-state supercharging operation at low flow rates;
an operating mode J wherein the second turbo charging device drives the supercharging in a single-state supercharging operation at high flow rates; and
an operating mode K wherein the electrical motor/generator, controls rotational speed of the first turbo charging device during a two-state supercharging operation.

Furthermore, according to an exemplifying embodiment of the hybrid system, it is arranged to operate in any one of the operating modes A to K, as described above.

According to an exemplifying embodiment of the hybrid system, the mode control sequence comprises engaging or disengaging the first, second and third clutches (18a, 18a, 18b), operating the electric motor in drive mode or generate mode, (20), opening or closing a first (21a) and a second (21b) air by-pass valve, and opening or closing a first (22a) and a second (22b) waste gate based on the selected operating mode (Mode) according to the following:

| Mode: | 18a | 18b | 18c | 20 | 21a | 21b | 22a | 22b |
|---|---|---|---|---|---|---|---|---|
| I | N/A | N/A | N/A | N/A | Closed | Open | N/A | Open |
| J | N/A | N/A | N/A | N/A | Open | Closed | Open | N/A |
| K | N/A | N/A | N/A | N/A | Closed | Closed | N/A | N/A |

According to an exemplifying embodiment of the hybrid system, the input parameters further comprises at least one of the following:
a first pressure and/or mass flow parameter representative of air intake operational state (p1);
a second pressure and/or mass flow parameter representative of second compressor operational state (p2);
a third pressure and/or mass flow parameter representative of first compressor operational state (p3);
a fourth pressure and/or mass flow parameter representative of exhaust gas operational state (p4);
a fifth pressure and/or mass flow parameter representative of first turbine operational state (p5); and/or
a sixth pressure and/or mass flow parameter representative of second turbine operational state (p6).

Furthermore, the electric motor/generator of the hybrid system is, according to an exemplifying embodiment, arranged to control rotational speed of the charging device, or charging devices. Thereby, the pressure and mass flow of the first charging device in relation to the second charging device and in relation to parameter values representative of overall hybrid system and engine operations may advantageously be controlled by actively increasing, or decreasing, the rotational speed of the turbine and compressor of the first charging device with the electric motor/generator.

Moreover, the supercharging system of the hybrid system may also comprise the features which are described below in relation to the fourth aspect of the present invention.

According to a second aspect thereof, the present invention relates to a method for operating a hybrid system for propulsion of a vehicle comprising an internal combustion engine;
the hybrid propulsion system comprising a supercharging system for the internal combustion engine including an exhaust gas propelled turbo supercharging system, a mechanical supercharging system, and an electrical supercharging/regenerating system;
wherein the exhaust gas propelled turbo supercharging system includes a turbo charging device;
the turbo charging device comprising a turbine and a compressor, the compressor being arranged on a compressor shaft;
the exhaust gas propelled turbo supercharging system coupling the turbine to at least one exhaust outlet of the internal combustion engine, the electrical supercharging/regenerating system coupling an electric motor/generator, to the compressor shaft via a planet gear/traction device, and the mechanical supercharging system coupling a crank shaft of the engine to the electric motor via a clutch,
the method comprising operating the hybrid system in at least one of a plurality of different operating modes.

According to an exemplifying embodiment of the method for operating a hybrid system, the clutch is a first clutch and wherein the hybrid system further comprises a second clutch, wherein the planetary gear is coupled to the electric motor/generator via the second clutch.

According to an exemplifying embodiment of the method for operating a hybrid system, the hybrid system further comprises: a third clutch for connecting the power transmission to the crank shaft of the combustion engine.

According to an exemplifying embodiment of the method for operating a hybrid system for propulsion of a vehicle, the plurality of operating modes comprises:
an operating mode A comprising driving auxiliary loads of the internal combustion engine with the electrical motor through mechanically driving the auxiliary belt, or by generator by providing electrical power to electrical driven auxiliary loads;
an operating mode B comprising starting the internal combustion engine with the electric motor, from engine shut-off;
an operating mode C comprising propelling the vehicle with the electric motor, by its own or by providing motive power together with the internal combustion engine; and/or
an operating mode D comprising regenerating electrical energy from brake energy by retarding the vehicle.

According to an exemplifying embodiment of the method for operating a hybrid system for propulsion of a vehicle, the plurality of operating modes comprises:

an operating mode E where exhaust gas energy is regenerated to electrical energy;

an operating mode F where exhaust gas energy is regenerated to mechanical energy;

an operating mode G comprising electrically driven supercharging of the internal combustion engine; and an operating mode H comprising mechanically driven supercharging of the internal combustion engine.

According to an example embodiment of the method for operating a hybrid system for propulsion of a vehicle, the turbo charging device is a first turbo charging device with a first turbine connected to a first compressor via a first compressor shaft, and wherein the hybrid system further comprising a second turbo charging device comprising a second turbine and a second compressor, the second compressor being arranged on a second compressor shaft.

According to an example embodiment of the method for operating a hybrid system for propulsion of a vehicle, the plurality of operating modes comprises:

an operating mode I comprising driving the first turbo charging device in a single-state supercharging operation at low flow rates;

an operating mode J comprising driving the second turbo charging device in a single-state supercharging operation at high flow rates; and an operating mode K comprising controlling, with the electrical motor/generator, the rotational speed of the first turbo charging device during a two-state supercharging operation.

Furthermore, the method is advantageous for controlling systems comprising separate supercharging systems, since it may reduce the need for several methods/control sequences and several different supercharging systems.

Effects and features of this second aspect are largely analogous to those described above in relation to the first aspect of the present invention.

According to a third aspect thereof, the present invention relates to a control sequence for a hybrid system including an exhaust gas propelled turbo supercharging system, a mechanical supercharging system, and an electrical supercharging/regenerating system, a charging device and an electric motor/generator, operatively connected to the charging device, wherein the hybrid system is arranged to operate in different operating modes.

For example, according to an exemplifying embodiment of the control sequence for a hybrid system, it is configured for engaging or disengaging a first (18a), second (18b) and third (18c) clutches, operating an electric motor (20) in drive mode or generate mode, based on a selected operating mode (Mode) according to the following:

| Mode: | 18a | 18b | 18c | 20 |
|---|---|---|---|---|
| A | Engaged | Disseng. | Disseng. | Drive |
| B | Engaged | Disseng. | Engaged | Drive |
| C | Engaged | N/A | Engaged | Drive |
| D | Engaged | N/A | Engaged | Generate |

For example, according to an exemplifying embodiment of the control sequence for a hybrid system, the control sequence is configured for engaging or disengaging a first (18a), a second (18b) and a third (18c) clutch, operating an electric motor (20) in drive mode or generate mode, opening or closing an air by-pass valve (21), and opening or closing a waste gate (22) of the hybrid system based on a selected operating mode (Mode) according to the following:

| Mode: | 18a | 18b | 18c | 20 | 21 | 22 |
|---|---|---|---|---|---|---|
| E | N/A | Engaged | N/A | Generate | N/A | N/A |
| F | Engaged | Engaged | Engaged | Generate | N/A | N/A |
| G | Disseng. | Engaged | Engaged | Drive | Closed | N/A |
| H | Engaged | Engaged | Engaged | N/A | Closed | N/A |

According to an exemplifying embodiment of the control sequence for a hybrid system, the charging device is a first turbo charging device with a first turbine connected to a first compressor via a first compressor shaft, and wherein the hybrid system further comprises a second turbo charging device comprising a second turbine and a second compressor, the second compressor being arranged on a second compressor shaft.

For example, according to an exemplifying embodiment of the control sequence for a hybrid system, it is configured for engaging or disengaging a first (18a), second (18b) and third (18c) clutches, operating an electric motor (20) in drive mode or generate mode, opening or closing a first (21a) and a second (21b) air by-pass valve, and opening or closing a first (22a) and a second (22b) waste gate of the hybrid system based on a selected operating mode (Mode) according to the following:

| Mode: | 18a | 18b | 18c | 20 | 21a | 21b | 22a | 22b |
|---|---|---|---|---|---|---|---|---|
| I | N/A | N/A | N/A | N/A | Closed | Open | N/A | Open |
| J | N/A | N/A | N/A | N/A | Open | Closed | Open | N/A |
| K | N/A | N/A | N/A | N/A | Closed | Closed | N/A | N/A |

Effects and features of this third aspect are largely analogous to those described above in relation to the first and second aspects of the present invention.

According to a fourth aspect thereof, the present invention relates to a supercharging system for an internal combustion engine, comprising: a first charging device with a first turbine connected to a first compressor via a first compressor shaft, the compressor having a high speed shaft; a planetary gear coupled between the high speed shaft and an electric motor/generator; a first clutch; and a power transmission for connecting a crank shaft of the combustion engine to the electric motor/generator via the first clutch; the supercharging system further comprising a second charging device with a second turbine connected to a second compressor via a second compressor shaft.

According to an exemplifying embodiment, the supercharging system further comprises a system control arranged to control a parameter representative of pressure and/or mass flow of the first charging device in relation to the second charging device during matching between the first and the second charging devices.

For example, according to an exemplifying embodiment of the supercharging system, the system control may be arranged to control the pressure and/or mass flow operating point of the first charging device in relation to the second charging device during matching between the first and to the second charging device. For example, the electric motor is controlled, or arranged, to maintain boost pressure of compressed air to be delivered into the internal combustion engine during switch-over conditions. Furthermore, the electric motor may be controlled, or arranged, to match the operating point of the first charging device with the operating point of the second charging device during switch-over, when the second charging device is operating in a free-floating configuration. Hence, it is e.g. possible to momentarily assist the first charging device by electrical drive if required.

According to an exemplifying embodiment of the supercharging system, the supercharging system comprises a system control arranged to control the rotational speed of the first charging device according to a reference speed value based on at least one parameter representative of an operational property of the supercharging system provided to the system control. For example, the system control may also be arranged to control the supercharging system, and the first charging device of the supercharging system, based on operational parameters representative of e.g. engine rpm, engine throttle position and/or derivatives thereof, and/or a driver pedal position and/or derivatives thereof. For example, the position of the driver pedal, and/or derivatives thereof, may initiate controlling, by the system control, of the rotational speed of the electric motor and the compressor of the first charging device.

Moreover, according to an exemplifying embodiment, the electric motor/generator comprises a sensor arranged to generate a motor speed parameter value representative of the rotational speed of the electric motor/generator, wherein the system control is arranged to control the rotational speed of the first charging device, i.e. the turbo speed, based on the motor speed parameter according to a control sequence. For example, the sensor may be arranged as a separate unit and/or be at least partly formed by the electric motor/generator itself.

The supercharging system may further comprises waste gates for enabling improved and more efficient operation of the supercharging system by controlling and adjusting the mass flow through the turbines of the system. For example, according to an exemplifying embodiment of the supercharging system, it comprises an operable first waste gate coupled between an inlet side of the first turbine and an inlet side of the second turbine. According to a further exemplifying embodiment of the supercharging system, it further comprises a second waste gate coupled between the inlet side of the second turbine and an exhaust gas outlet.

Moreover, according to exemplifying embodiments of the supercharging system, it further comprises a first air by-pass valve and/or a second air by-pass valve, wherein the by-pass valves are arranged for at least partly bypassing the first and second compressor of the first and second charging devices, respectively, during operation of the supercharging system.

According to an exemplifying embodiment of the supercharging system, the first charging device is a variable nozzle turbine, and the supercharging system further comprises a system control operatively connected to determine and control the state of the variable nozzle turbine, the first, second and third clutches, the electric motor/generator, the first and second air by-pass valves, and the first and second first waste gates. Hence, the system control is arranged to retrieve, or receive signals from the different components of the supercharging system and determine their operational state, and to further control the supercharging system by controlling the components of the system. For example, the system control communicates over a communication network connected to the supercharging system. The communication network may e.g. be a CAN-bus network, or any other suitable communication network. The system control may further communicate with and/or retrieve information from surrounding control units, such as an engine control, a vehicle control, etc. The described supercharging system may be incorporated in the above described hybrid system. However, the supercharging system is not limited to be incorporated in the above hybrid system and may hence also be incorporated in other systems as well.

Further effects and features of this fourth aspect are largely analogous to those described above in relation to the first, second and third aspects of the present invention.

According to a fifth aspect thereof, the present invention relates to a method for operating a supercharging system for the internal combustion engine including an exhaust gas propelled turbo supercharging system, a mechanical supercharging system, and an electrical supercharging/regenerating system;

wherein the exhaust gas propelled turbo supercharging system includes a first and second turbo charging device;

the first turbo charging device comprising a first turbine and a first compressor, the first compressor being arranged on a first compressor shaft;

the second turbo charging device comprising a second turbine and a second compressor, the second compressor being arranged on a second compressor shaft;

the exhaust gas propelled turbo supercharging system coupling the first and second turbines to at least one exhaust outlet of the internal combustion engine, the electrical supercharging/regenerating system coupling an electric motor/generator, to the first and/or second compressor shaft via a planet gear, and the mechanical supercharging system coupling a crank shaft of the engine to the electric motor via a first clutch, the method comprising: sensing and/or controlling rotational speed of the first compressor of the first turbo charging device with the electric motor during matching between the first and to the second turbo charging devices.

Hence, the method provides improved and more efficient operation of the supercharging system, wherein the pressure dips of the supercharging system and torque dips associated with the internal combustion engine during matching between a first and second charging device may be reduced, or avoided. In more detail, the method and system allow for direct control of the first charging device since it is connected to an electric motor which may be utilized for measuring the operational state of the turbine and compressor of the first charging device, and to control the operation, such as the rotational speed, of the compressor of the first charging device. Furthermore, the method is advantageous in similar manners as described above in relation to the supercharging system and the hybrid drive system.

According to an exemplifying embodiment of the method for operating a supercharging system, it further comprises driving the first compressor of the first turbo charging device with the electric motor until a reference pressure and/or mass flow (p3) of the supercharging system is obtained. For example, the reference pressure and/or mass flow value is representative of the operating pressure of mass flow provided by the supercharging system to the intake manifold, or e.g. an intercooler device, associated with the internal combustion engine.

Further effects and features of this fifth aspect are largely analogous to those described above in relation to the first, second, third and fourth aspects of the present invention.

According to a sixth aspect thereof, the present invention relates to a mode selector control sequence for a hybrid system including an exhaust gas propelled turbo supercharging system, a mechanical supercharging system, and an electrical supercharging/regenerating system, a first charging devices including a first turbine and a first compressor, a second charging devices including a second turbine and a second compressor, and an electric motor/generator, operatively connected to the first charging device, wherein the hybrid system is arranged to operate in different operating modes, the mode selector algorithm being configured to select an operating mode for the hybrid system based on input parameter values representative of respective operating states of a first, second and third clutches, a operating state of an electric motor, respective operating states of a first and second air by-pass valves, and operating states of a first and second waste gates, of the hybrid system.

According to an exemplifying embodiment of the mode selector control sequence, the input parameters further comprises at least one of the following:

a first pressure and/or mass flow parameter representative of air intake operational state (p1);

a second pressure and/or mass flow parameter representative of second compressor operational state (p2);

a third pressure and/or mass flow parameter representative of first compressor operational state (p3);

a fourth pressure and/or mass flow parameter representative of exhaust gas operational state (p4);

a fifth pressure and/or mass flow parameter representative of first turbine operational state (p5); and/or a sixth pressure and/or mass flow parameter representative of second turbine operational state (p6).

Effects and features of this sixth aspect are largely analogous to those described above in relation to the first, second, third, fourth and fifth aspects of the present invention.

According to a seventh aspect thereof, the present invention relates to a supercharging system for an internal combustion engine, comprising: a first charging device with a first turbine connected to a first compressor via a first compressor shaft, the compressor having a high speed shaft; a planetary gear coupled between the high speed shaft and an electric motor/generator; a first clutch; and a power transmission for connecting a crank shaft of the combustion engine to the electric motor/generator, via the first clutch; wherein the supercharging system further comprises a second clutch; wherein the planetary gear is coupled to the electric motor/generator, via the second clutch.

Hereby, the planetary gear and the electric motor/generator may be connected and disconnected from each other. This enables a desirable connection between the electric motor/generator and the planetary gear traction device in modes of operation such as, for example, when the internal combustion engine is running and simultaneously regenerates energy to the electric generator. As also described above, the electric motor/generator may be disconnected from the planetary gear when, for example, the combustion engine is turned off, when idle speed is non-stable or when oil pressure is low and is about to be built up in the supercharging system.

Effects and features of this seventh aspect are largely analogous to those described above in relation to the first, second, third, fourth, fifth and sixth aspects of the present invention.

Generally, other objectives, features, and advantages of the present invention that will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein.

Figure 1A:
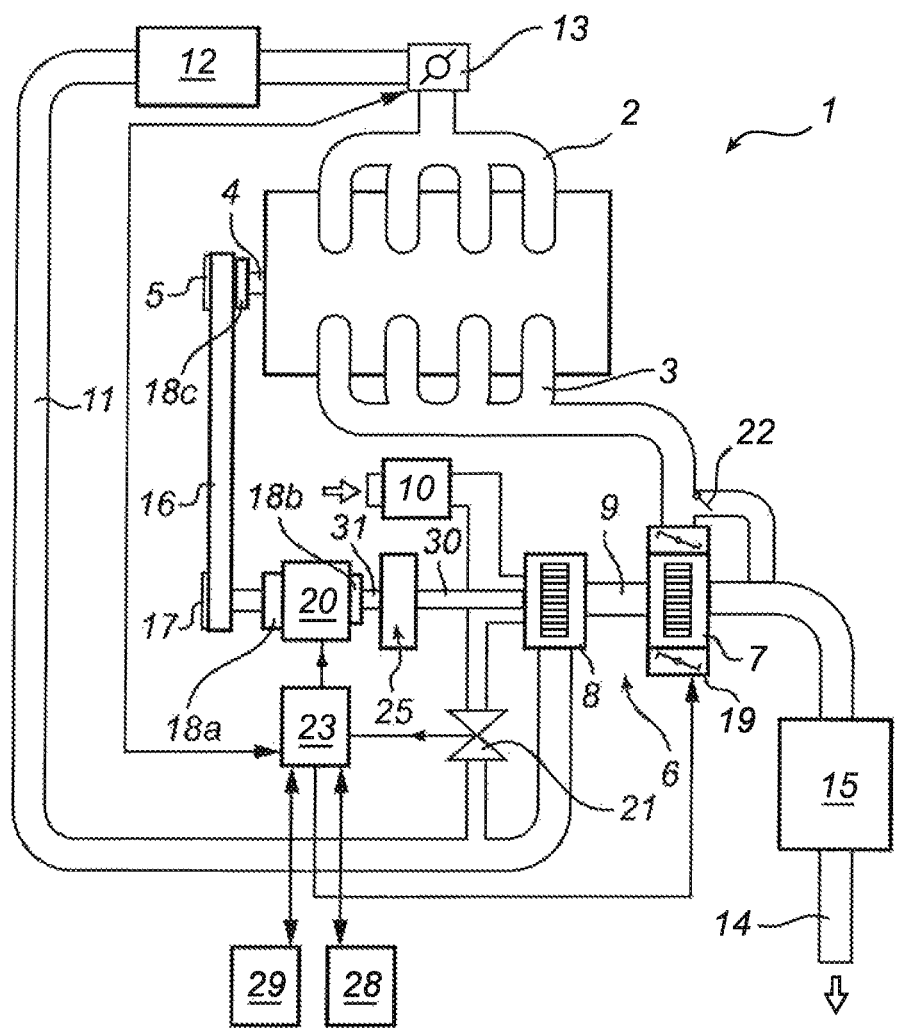
FIG. 1a is a schematic view of a supercharging system and a hybrid drive system according to an embodiment of the present invention.

It should be understood that the drawings are only schematic and not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar, or equal elements are referred to by equal reference numerals.

Reference is now drawn to the figures, and to FIG. 1a in particular depicting an internal combustion engine 1 having an air intake manifold 2 with four air intake pipes, depicting that the engine has four cylinders. However, the number of cylinders can be higher as well as lower. The internal combustion engine 1 further has an exhaust gas manifold 3, having four exhaust gas pipes for the four cylinders of the engine.

Attached to the engine block is a charging device 6 comprising a turbo charging device comprising a turbine 7 and a compressor 8 arranged on a common shaft 9 in such a way that when the turbine rotates the compressor rotates simultaneously. The compressor 8 is connected to a high-speed shaft 30 projecting in the opposite direction to the common turbine/compressor shaft 9. The turbine is driven by the exhaust gases from the exhaust gas manifold 3, and an impeller (not shown) of the co-rotating compressor 8 is compressing ambient air which is sucked in via an air filter 10. The compressed air is lead through a duct 11 via an intercooler 12 and a throttle 13 into the internal combustion engine 1 through the air intake manifold 2, whereas the exhaust gases after having passed the turbine are evacuated via an exhaust gas conduit 14 with a catalyzer 15. The throttle 13 may for example be an electrically controlled throttle.

The engine 1 has a crankshaft 4 which protrudes outside the engine and is equipped with a pulley 5. The pulley 5 is rotating with the crankshaft 4 of the engine and transfers via a belt drive 16 rotation to a shaft 17, which via a one way clutch 18a is coupled to an electric motor/generator 20, which in turn is coupled through a low-speed shaft 31 to a ring gear wheel (not shown) of a planetary gear 25 with planet gear wheels (not shown) and a sun gear wheel (not shown) connected to the high-speed shaft 30. In this manner the rotation of the crank shaft 4 can be transferred to the shaft 9, which is the common shaft for the turbine 7 and the compressor 8, in situations where the turbine has not reached its working area. The belt drive described is not limited to be a belt drive, any type of appropriate transmission units can be used. The clutch mentioned can be mechanical one way clutch of any appropriate type, although electric clutches, viscous couplings and the like are also possible.

Furthermore, the catalyzer may be preheated up to normal operating temperature by driving the electric motor 20 which hence affecting the charging device 6 which heats the catalyzer 15. Hereby, the catalyzer may be heated to its operating temperature, or approximately to its operating temperature, before the internal combustion engine is turned on, thereby reducing pollution as well as fuel consumption.

The engine also incorporates a compressor bypass valve 21 and a waste gate 22. The compressor bypass valve 21 is controlled by way of a system control 23, which based on different engine behaviour parameters, will operate for maintaining the rotational speed of the turbine so high as possible in order to avoid dangerous pressure increase at the exhaust side. The system control 23 is further operatively connected to an engine control 28, and a vehicle control 29.

Furthermore, as described above, the planetary gear 25 comprises e.g. a ring wheel, two or a plurality of planet wheels, and a sun wheel. In more detail, the high speed shaft 30 of the charging device 6, which high speed shaft 30 is connected to and extends from the compressor shaft 9, is connected to the sun wheel, on a high speed side of the planetary gear 25. On the other side of the planetary gear 25, on a low speed side, a low speed shaft 31 is connected to and provided between the ring wheel and a second clutch 18b. The second clutch 18b connects the low speed shaft with the electrical motor/generator 20, or, in more detail, a rotor member of the electric motor/generator 20. The second clutch 18b may be arranged to disconnect the electric motor/generator 20 from the planetary gear 25 when the combustion engine is turned off. Hereby, the electric motor can drive auxiliary loads of the vehicle. Also, the second clutch 18b may be disengaged when oil pressure is low and is about to be built up in the supercharging system, or when idle speed is unstable. Accordingly, when the oil pressure has reach a desired pressure level and/or when the idle speed is stable, the second clutch 18b connects the electric motor/generator 20 with the planetary gear.

As illustrated, the low speed shaft 31 on the low speed side of the planetary gear 25 coincides with the axis of the electrical motor/generator 20. Hence, the low speed shaft 31 is also coupled to the crankshaft 4 of the engine 1 via clutches 18a, 18b, and 18c.

However, the electrical motor/generator 20 may be arranged separated from and connected to the low speed shaft 31 via a suitable transmission, such as a belt drive. Furthermore, the electrical motor/generator 20 may be operatively connected to the common axis of the high speed shaft 30 and low speed shaft 31 on the high speed side of the planetary gear 25. For example, a high speed electrical motor/generator may be used and operatively connected to the high speed shaft 30, optionally via a clutch.

As illustrated in FIG. 1a, the system 1 comprises power transmission 16, such as a belt drive, which operatively connects the common axis of the electric motor/generator 20 and low speed shaft 31, via a first clutch 18a and third clutch 18c, to the crankshaft 4 of the engine 1, such that rotational power may be transferred between the crankshaft and the common axis of the electric motor/generator 20, the low speed shaft 31, planetary gear 25, and the high speed shaft 30, depending on the configuration of the first 18a and second 18b clutches.

For example, the high speed shaft 30 may be used for providing rotational power from the electric motor/generator to the charging device 6 for enabling e.g. electrically powered charging of the internal combustion engine, referred to as e-boost, or for enabling mechanically powered turbo charging of the electrical engine by using mechanical rotational power from the internal combustion engine. The high speed shaft 30 may also be used for obtaining, or extracting, the rotational power generated in the charging device, typically in the turbine, and to convert this produced rotational power into electric energy be means of the electric motor which is configured to operate as a generator and which is connected to the drive shaft, or to convert the rotational power into mechanical power be means of the power transmission 16.

As further illustrated, the first charging device includes a variable nozzle turbine (VNT) which comprises variable vanes 19 which may be adjusted by the system control 23 in order adapted the turbine to current exhaust gas flow condition and the operational mode of the supercharging system. The system control 23 is connected to and arranged to control the first 18a, second 18b and third 18c clutches, and the engine's throttle 13 according to the different operating modes of the hybrid system 100, such as operating modes A-H described above.

Figure 1B:
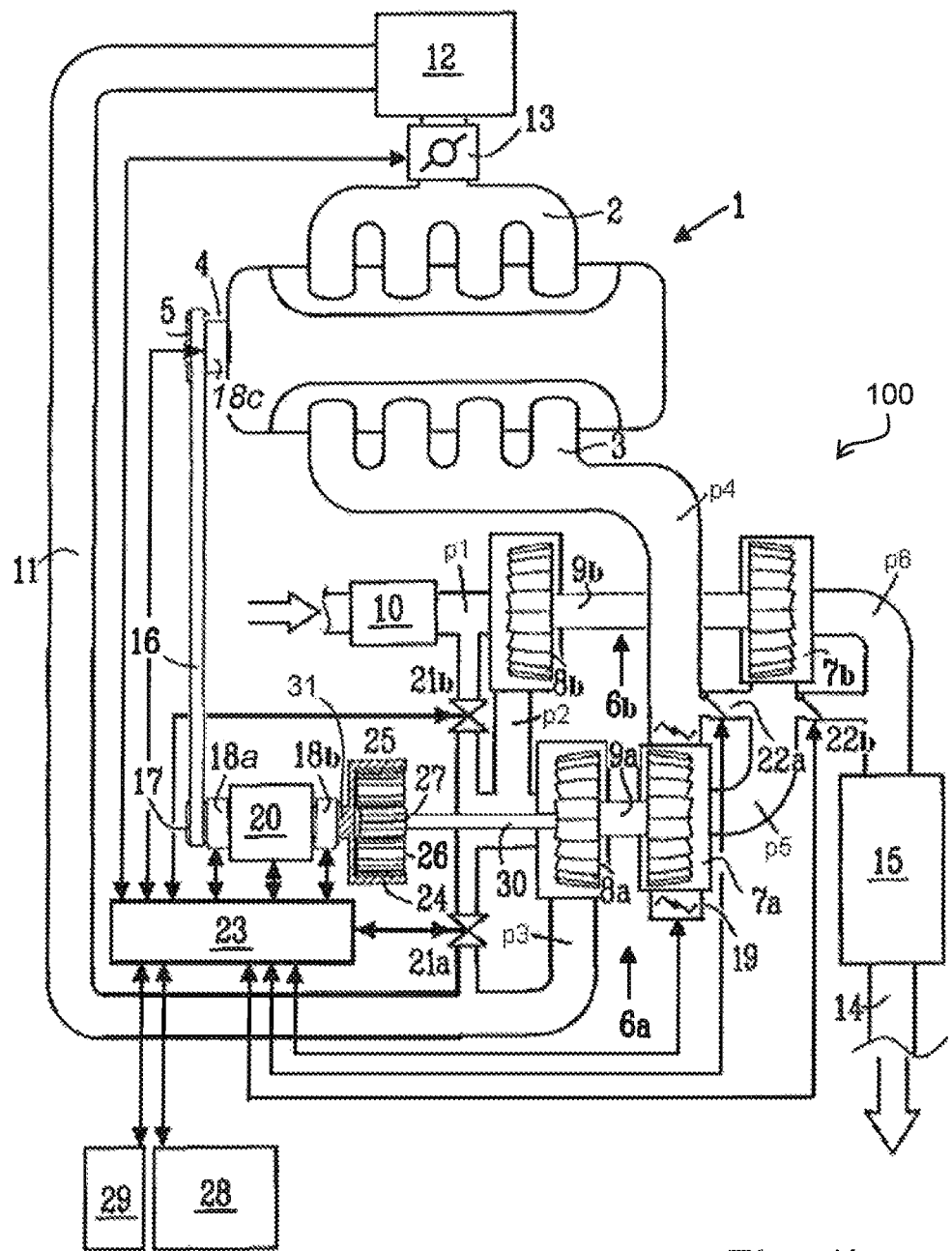
FIG. 1b is a schematic view of a supercharging system and a hybrid drive system according to a further embodiment of the present invention.

Turning to FIG. 1b, there is depicted a schematic view of a supercharging system 100 and/or hybrid drive system 100 according to an embodiment of the present invention, is illustrated. The supercharging system 100 comprises an internal combustion engine 1, in the following also referred to as the engine 1, comprising an intake manifold 2 for allowing compressed air to enter into the engine 1. The engine 1 further comprises a exhaust manifold 3 for exhaust gases leaving the engine 1, which exhaust gases are used for driving turbines 7a and 7b of a first 6a and a second 6b charging device, respectively. The engine further comprises a crankshaft which is arranged to provide rotational power for propelling a vehicle, such as a car, truck, lift-truck, construction vehicle, buss, ship, boat, aircraft, or other vehicles or crafts, via a propulsion drive line. A crankshaft pulley 5 is connected to the crankshaft 4, which pulley 5 forms part of a belt drive power transmission between the crankshaft 4 and an electric motor/generator 20. However, the power transmission between engine and electrical motor is not limited to a belt drive transmission.

As illustrated, the system 100 comprises a first charging device 6a comprising a first turbine 7a being arranged downstream of, in relation to the exhaust gas flow, and connected to the exhaust gas manifold 3, and a first compressor 8a for generating compressed air to the supplied to the engine 1. The first turbine 7a is connected via a first compressor shaft 9a to the first compressor 8a, such that rotational power provided by the exhaust gases from the engine to the first turbine 7a may be transferred to the first compressor 8a. The system 100 further comprises a second charging device 6b comprising a second turbine 7b being arranged downstream of, in relation to the exhaust gas flow, and connected to the outlet side of the first turbine 7a, and a second compressor 8b for generating compressed air to the supplied to the engine 1. The second turbine 7b is connected via a second compressor shaft 9b to the second compressor 8b, such that rotational power provided by the exhaust gases from the engine to the second turbine 7b may be transferred to the second compressor 8b. Hence, the second charging device 6b is arranged sequentially after the first charging device 6a, in relation to the exhaust gas flow. However, the invention is not limited to this configuration, and the second charging device 6b may be arranged before, or in a parallel configuration with, the first charging device 6a, in relation to the exhaust gas flow.

On an exhaust gas system side of the system 100, it further comprises a first 22a and second 22b waste gate which enables bypassing of the exhaust gases in relation to the first 7a and second 7b turbines, respectively, either independently or in combination. For example, if partially opened, the waste gates 22a, 22b enable bypassing of at least a portion of the exhaust gas directly to an exhaust system outlet 14, optionally via an exhaust gas catalyzer 15.

On a compressor system side of the system 100, air from an air inlet and air inlet filer 10 is compressed and provided to the engine e.g. via engine air inlet ducts 11, intercooler 12 and/or throttle 13. The air is at least partly compressed by the first 8a and second 8b compressors, independently or in combination, depending on the configuration of a first 21a and a second 21b air by-pass valves.

By adjusting the air by-pass vales 21a, 21b and the waste gates 22a, 22b, the relative operation of the first and second charging device 6a and 6b may be adjusted in relation to each other, such that only one is operational in a single stage operational mode, or both are operational in an combined operational mode wherein the operational ratio between the first and second charging devices may be suitably adjusted.

As further illustrated, the first charging device 6a is arranged along a common axis with, and operatively connected to, via a planetary gear 25, to the electrical motor/generator 20 such that the electrical motor/generator 20 may, according to various embodiments, operate both as an electric motor and/or as an electrical generator.

As schematically illustrated, the planetary gear 25 comprises e.g. a ring wheel 24, two or a plurality of planet wheels 26, and a sun wheel 27. In more detail, a high speed shaft 30 of the first charging device 6a, which high speed shaft 30 is connected to and extends from the first compressor shaft 9a, is connected to the sun wheel 27, on a high speed side of the planetary gear 25. On the other side of the planetary gear 25, on a low speed side, a low speed shaft 31 is connected to and provided between the ring wheel 24 and a second clutch 18b. The second clutch 18b connected the low speed shaft with the electrical motor/generator 20, or, in more detail, a rotor member of the electric motor/generator 20.

As illustrated, the low speed shaft 31 on the low speed side of the planetary gear 25 coincides with the axis of the electrical motor/generator 20. Hence, the low speed shaft 31 is also coupled to the crankshaft 4 of the engine 1 via clutches 18a, 18b, and 18c.

However, the electrical motor/generator 20 may be arranged separated from and connected to the low speed shaft 31 via a suitable transmission, such as a belt drive. Furthermore, the electrical motor/generator 20 may be operatively connected to the common axis of the high speed shaft 30 and low speed shaft 31 on the high speed side of the planetary gear 25. For example, a high speed electrical motor/generator may be used and operatively connected to the high speed shaft 30, optionally via a clutch.

As illustrated in FIG. 1b, the system 1 comprises power transmission 16, such as a belt drive, which operatively connects the common axis of the electric motor/generator 20 and low speed shaft 31, via a first clutch 18a and third clutch 18c, to the crankshaft 4 of the engine 1, such that rotational power may be transferred between the crankshaft and the common axis of the electric motor/generator 20, the low speed shaft 31, planetary gear 25, and the high speed shaft 30, depending on the configuration of the clutches 18a and 18b.

For example, the high speed shaft 30 may be used for providing rotational power from the electric motor/generator to the first charging device for enabling e.g. electrically powered charging of the internal combustion engine, referred to as e-boost, or for enabling mechanically powered turbo charging of the engine by using mechanical rotational power from the internal engine. The high speed shaft 30 may also be used for obtaining, or extracting, the rotational power generated in the charging device, typically in the turbine, and to convert this produced rotational power into electric energy be means of the electric motor which is configured to operate as a generator and which is connected to the drive shaft, or to convert the rotational power into mechanical power be means of the power transmission 16.

As further illustrated, the first charging device includes a variable nozzle turbine (VNT) which comprises variable vanes 19 which may be adjusted by the system control 23 in order adapted the turbine to current exhaust gas flow condition and the operational mode of the supercharging system. The system control 23 is further operatively connected to an engine control 28, and a vehicle control 29. The system control 23 is connected to and arranged to control the first 18a, second 18b and third 18c clutches, the first and second air by-pass vales 21a, 21b and the waste gates 22a, 22b, and the engine's throttle 13 according to the different operating modes of the hybrid system 100, such as operating modes A-K described above.

The system control 23 is further operatively connected to sensors arranged to output observation parameter values representative of air/exhaust gas pressure and/or mass flow at a plurality of observations point, or regions, such as the illustrated intake air point p1, second compressor point p2, first compressor point p3, exhaust gas point p4, first turbine point p5, and second turbine point p6.

Figure 2:
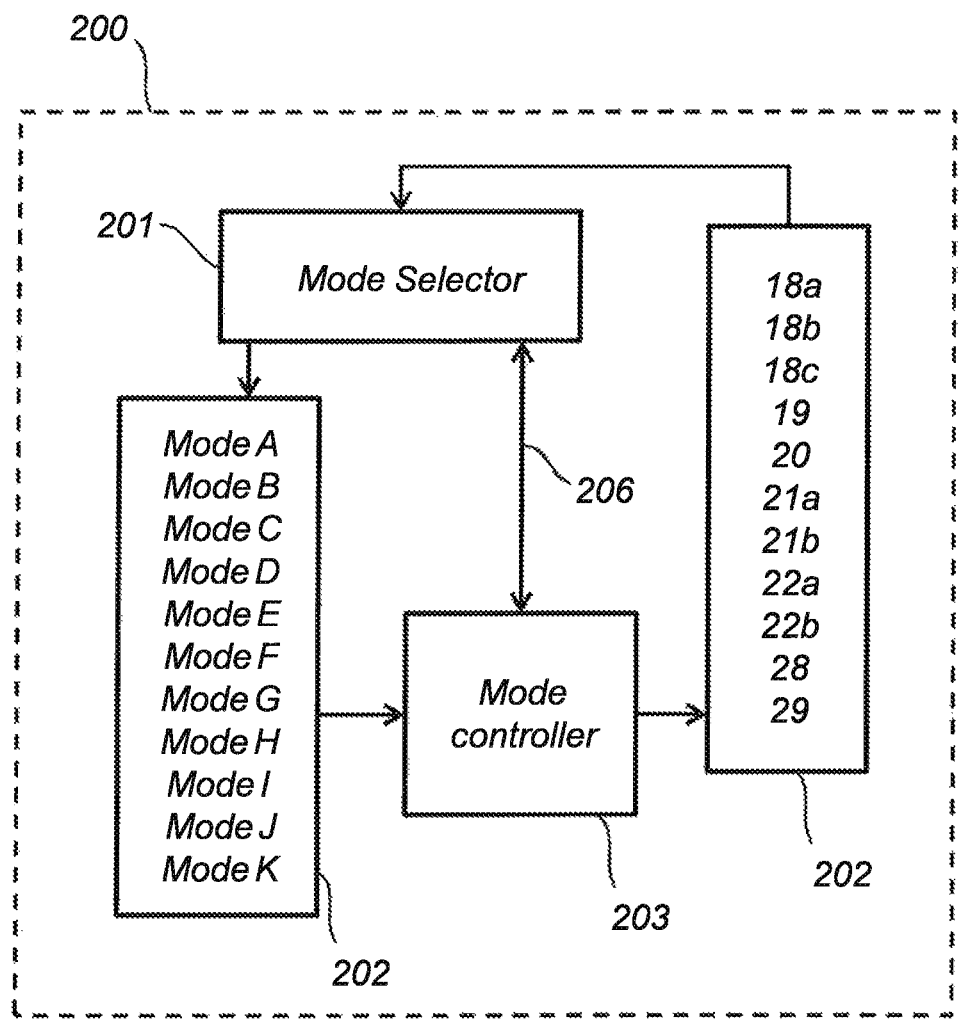
FIG. 2 is a schematic block diagram which illustrates embodiments of the system control of the supercharging device, and which schematically illustrates embodiments of the method for operating a supercharging system according to the present invention.

In FIG. 2, a block diagram which illustrates embodiments of the system control 200 of the hybrid system, and which schematically illustrates embodiments of method steps for operating a hybrid system according to the present invention, is schematically represented.

As illustrated, the system control 200 comprises a mode selecting subsystem 201 arranged to select an operating mode from a set 202 of operating modes A-K based on a set 204 of input/output parameter values from sensors and actuators of the hybrid system. The system control further comprises a mode controlling subsystem 203 arranged to control the hybrid system, based on the selected operating mode and the set 204 of input/output parameters values from sensors and actuators of the hybrid system. Furthermore, the mode controlling subsystem 203 provides a feedback control signal 206 to the mode selecting subsystem 201 which enables suitable shifting of operating modes based on the currently active operating mode.

Figure 3:
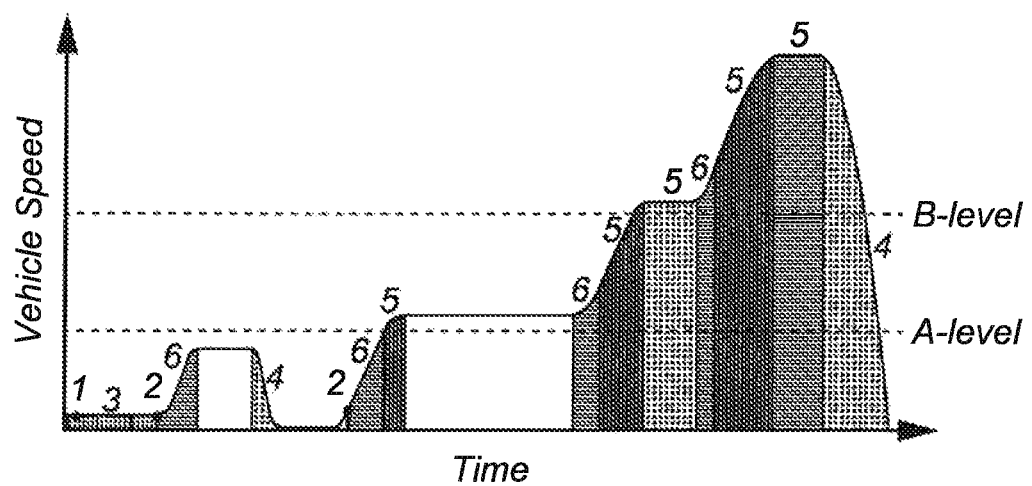
FIG. 3 is a schematic diagram of operating modes A-F of an embodiment of the supercharging system according to the present invention during generic vehicle driving conditions.

In FIG. 3, a diagram of exemplifying operating modes of the hybrid system according to the present invention during a generic vehicle driving sequence, is schematically illustrated. In more detail, the diagram illustrates a driving sequence comprising different operating modes A (indicated 1), B (indicated by 2), C (indicated by 3), D (indicated by 4), E (indicated by 5), and F (indicated by 6) occurring during a time period represented by the x-axis, wherein the y-axis represents vehicle speed.

The "A-level" is representative of a specific vehicle speed required in order to regenerate exhaust gas energy into useful power within the hybrid system during positive transient conditions, i.e. when the vehicle is accelerating. The "B-level" is representative of an exemplifying specific vehicle speed which may be required in order to regenerate exhaust gas energy into useful power within the hybrid system during steady-state conditions, i.e. when the vehicle is moving with constant speed.

For example, the specific speed requirements for passing these "levels" varies depending on vehicle and combustion engine parameters as well as surrounding conditions and is designing parameters when adapting the system to a specific application.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain features or steps are recited in mutually different dependent claims does not indicate that a combination of these features or method steps cannot be used to advantage.

I claim:

1. A hybrid system of an internal combustion engine (1) comprising:
   at least one charging device (6) with a turbine (7) connected to a compressor (8) via a compressor shaft (9), the compressor having a high speed shaft (30);
   a planetary gear (25) coupled between the high speed shaft (30) and an electric motor/generator (20);
   at least one clutch;
   wherein the at least one clutch includes a first clutch (18a), a second clutch (18b), and a third clutch (18c);
       a power transmission connecting a crank shaft (4) of the combustion engine (1) to the electric motor/generator, (20) via the first clutch (18a);
       at least one of an engine controller (28) and a vehicle controller (29) arranged to determine at least one of input parameters including an engine speed (rpm), an engine throttle position, and a driver pedal position, and
       an electronic control system (23) configured to operate the hybrid system in a plurality of different operating modes according to a control sequence based on the at least one of said input parameters including the engine speed (rpm), the engine throttle position, and the driver pedal position;
       wherein the plurality of said different operating modes comprising:
           an operating mode A where the electric motor drives auxiliary loads of the internal combustion engine (1);
           an operating mode B where the electric motor starts, or stops, the internal combustion engine (1);
           an operating mode C where the electric motor propels the vehicle; and
           an operating mode D where brake energy from retardation of the vehicle is regenerated to electrical energy.

2. The hybrid system according to claim 1, wherein the planetary gear (25) is coupled to the electric motor/generator (20) via the second clutch (18b).

3. The hybrid system according to claim 1, wherein the third clutch (18c) connects the power transmission to the crank shaft (4) of the combustion engine (1).

4. The hybrid system according to claim 1, wherein the plurality of said different operating modes further comprises:
   an operating mode E where exhaust gas energy is regenerated to electrical energy;
   an operating mode F where exhaust gas energy regenerated to mechanical energy;
   an operating mode G comprising electrically driven supercharging of the internal combustion engine (1); and
   an operating mode H comprising mechanically driven supercharging of the internal combustion engine (1).

5. The hybrid system according to claim 1, wherein the electronic control system comprises a mode selecting subsystem arranged to select one of the plurality of said different operating modes of the hybrid system based the input parameters according to a mode selector algorithm.

6. The hybrid system according to claim 1, wherein the electronic control system comprises a mode controlling subsystem arranged to control the hybrid system based on the selected operating mode and the input parameters according to a mode control sequence.

7. The hybrid system according to claim 6, further comprising:
   the third clutch (18c) for connecting the power transmission to the crank shaft (4) of the combustion engine (1);
   wherein the mode control sequence comprises:
       engaging or disengaging the first clutch, second clutch and third clutch (18a, 18b, 18c), and
       operating the electric motor (20) in drive mode or generate mode based on the selected operating mode (Mode) according to the following:

| Mode: | 18a | 18b | 18c | 20 |
| --- | --- | --- | --- | --- |
| A | Engaged | Disseng. | Disseng. | Drive |
| B | Engaged | Disseng. | Engaged | Drive |
| C | Engaged | N/A | Engaged | Drive |
| D | Engaged | N/A | Engaged. | Generate. |

8. The hybrid system according to claim 6, further comprising:
   the third clutch (18c) for connecting the power transmission to the crank shaft (4) of the combustion engine (1);
   wherein the mode control sequence comprises
       engaging or disengaging the first clutch, second clutch and third clutch (18a, 18b, 18c),
       operating the electric motor,
       opening or closing an air by-pass valve (21), and
       opening or closing a waste gate (22) based on the selected operating mode (Mode) according to the following:

| Mode: | 18a | 18b | 18c | 20 | 21 | 22 |
| --- | --- | --- | --- | --- | --- | --- |
| E | N/A | Engaged | N/A | Generate | N/A | N/A |
| F | Engaged | Engaged | Engaged | Generate | N/A | N/A |
| G | Disseng. | Engaged | Engaged | Drive | Closed | N/A |
| H | Engaged | Engaged | Engaged | N/A | Closed | N/A. |

9. The hybrid system according to claim 6, further comprising at least one of the engine controller (28) and the vehicle controller (29) arranged to determine a first vehicle parameter representative of the engine rpm, a second vehicle parameter representative of at least one of the engine throttle position and derivatives thereof, and a third vehicle parameter representative of at least one of the driver pedal position and derivatives thereof,
   wherein the electronic control system (23) is arranged to control the hybrid system based on the first, second and third vehicle parameters.

10. The hybrid system according to claim 6, further comprising a battery operatively coupled to the electric motor/generator;

wherein the electronic control system (23) is configured to execute at least one of:
  determining a change of the driver pedal position;
  closing the air by-pass valve (21);
  determining threshold state-of-charge (SOC) value of the battery; and
  determining available electric power by comparing battery state-of-charge (SOC) with the predetermined threshold SOC-value.

11. The hybrid system according to claim 10, wherein, if battery state-of-charge is above the threshold SOC-value, the electronic control system (23) is configured to operate the electric motor in drive mode to generate supercharging until at least one of a reference pressure and a mass flow (p3) is obtained.

12. The hybrid system according to claim 1, wherein the charging device includes a first turbo charging device (6a) with a first turbine (7a) connected to a first compressor via a first compressor shaft (9a), and a second turbo charging device (6b) with a second turbine (7b) connected to a second compressor via a second compressor shaft (9b).

13. The hybrid system according to claim 12, wherein the plurality of said operating modes comprises:
  an operating mode I wherein the first turbo charging device drives the supercharging in a single-state supercharging operation at low flow rates;
  an operating mode J wherein the second turbo charging device drives the supercharging in a single-state supercharging operation at high flow rates; and
  an operating mode K wherein the electric motor/generator, controls rotational speed of the first turbo charging device during a two-state supercharging operation.

14. The hybrid system according to claim 13, wherein the plurality of said operating modes comprises:
  an operating mode A where the electric motor drives auxiliary loads of the internal combustion engine (1):
  an operating mode B where the electric motor starts, or stops, the internal combustion engine (1):
  an operating mode C where the electric motor propels the vehicle: and an operating mode D where brake energy from retardation of the vehicle is regenerated to electrical energy; and
wherein the hybrid system operates in a plurality of different operating modes of A-K.

15. The hybrid system according to claim 13;
wherein the mode control sequence executes at least one of:
  engaging or disengaging the first clutch, second clutch and third clutch (18a, 18b, 18c),
  operating the electric motor (20) in drive mode or generate mode,
  opening or closing a first and a second air by-pass valve (21a,21b), and
  opening or closing a first and a second waste gate (22a, 22b) based on the selected operating mode (Mode) according to the following:

| Mode: | 18a | 18b | 18c | 20 | 21a | 21b | 22a | 22b |
|---|---|---|---|---|---|---|---|---|
| I | N/A | N/A | N/A | N/A | Closed | Open | N/A | Open |
| J | N/A | N/A | N/A | N/A | Open | Closed | Open | N/A |
| K | N/A | N/A | N/A | N/A | Closed | Closed | N/A | N/A. |

16. The hybrid system according to claim 12, wherein the at least one of said input parameters further comprises:
  at least one of a first pressure and a mass flow parameter representative of air intake operational state (p1);
  at least one of a second pressure and a mass flow parameter representative of second compressor operational state (p2);
  at least one of a third pressure and a mass flow parameter representative of first compressor operational state (p3);
  at least one of a fourth pressure and a mass flow parameter representative of exhaust gas operational state (p4);
  at least one of a fifth pressure and a mass flow parameter representative of first turbine operational state (p5); and
  at least one of a sixth pressure and a mass flow parameter representative of second turbine operational state (p6).

17. The hybrid system according to claim 1, wherein the electric motor/generator (20) controls rotational speed of the at least one charging device (6; 6a, 6b).

18. A hybrid system of an internal combustion engine (1) having a supercharging system, the hybrid system comprising:
  a charging device (6) with a turbine (7) connected to a compressor (8) via a compressor shaft (9), the compressor having a high speed shaft (30);
  a planetary gear (25) coupled between the high speed shaft (30) and an electric motor/generator (20);
  a clutch (18a);
  a power transmission connecting a crank shaft (4) of the combustion engine (1) to the electric motor/generator, (20) via the clutch (18a); and
  an electronic control system (23) configured to operate the hybrid system in a plurality of different operating modes according to a control sequence based on at least one of a plurality of input parameters representative of operational properties of the hybrid system;
wherein the electric motor/generator (20) comprises a sensor configured to monitor an actual turbo speed without having a turbo speed sensor.

19. A hybrid system of an internal combustion engine (1) having a supercharging system, the hybrid system comprising:
  a charging device (6) with a turbine (7) connected to a compressor (8) via a compressor shaft (9), the compressor having a high speed shaft (30);
  a planetary gear (25) coupled between the high speed shaft (30) and an electric motor/generator (20);
  a clutch (18a);
  a power transmission connecting a crank shaft (4) of the combustion engine (1) to the electric motor/generator, (20) via the clutch (18a); and
  an electronic control system (23) configured to operate the hybrid system in a plurality of different operating modes according to a control sequence based on at least one of a plurality of input parameters representative of operational properties of the hybrid system;
wherein the charging device comprises a variable nozzle turbine, the variable nozzle turbine being controlled by determining an error value of a blade speed ratio, $BSR_{(error)}$, defined by a difference in a measured blade speed ratio, $BSR_{(error)}$, and a desired blade speed ratio $BSR_{(desired)}$.

20. A method of operating a hybrid propulsion system of a vehicle having an internal combustion engine (1); the hybrid propulsion system comprising:
  a supercharging system for the internal combustion engine (1) including an exhaust gas propelled turbo supercharging system, a mechanical supercharging system, and an electrical supercharging/regenerating system;

wherein the exhaust gas propelled turbo supercharging system includes a turbo charging device (6);
the turbo charging device comprising a turbine (7) and a compressor (8), the compressor being arranged on a compressor shaft (9);
the exhaust gas propelled turbo supercharging system coupling the turbine (8) to at least one exhaust outlet of the internal combustion engine (1), the electrical supercharging/regenerating system coupling an electric motor/generator (20) to the compressor shaft via a planetary gear (25), and the mechanical supercharging system coupling a crankshaft of the engine (1) to the electric motor via at least one clutch,
wherein the at least one clutch includes a first clutch (18a), a second clutch (18b), and a third clutch (18c); and
wherein the first clutch (18a) couples a crank shaft of the engine (1) to the electric motor;
wherein the second clutch (18b) couples the planetary gear/traction device (25) to the electric motor/generator (20);
wherein the third clutch (18c) connects the power transmission to the crank shaft (4) of the combustion engine (1);
the method of operating the hybrid system in at least one of a plurality of different operating modes via an electronic control system (23) comprising at least one of:
in an operating mode A, driving loads of the internal combustion engine (1) with the electric motor/generator;
in an operating mode B, starting, or stopping, the internal combustion engine (1) with the electric motor/generator;
in an operating mode C, propelling the vehicle with the electric motor/generator; and
in an operating mode D, regenerating electrical energy from brake energy by retarding of the vehicle.

21. The method according to claim 20, wherein the plurality of said different operating modes comprises:
an operating mode E where exhaust gas energy is regenerated to electrical energy;
an operating mode F where exhaust gas energy is regenerated to mechanical energy;
an operating mode G comprising electrically driven supercharging of the internal combustion engine (1);
an operating mode H comprising mechanically driven supercharging of the internal combustion engine (1).

22. The method according to claim 20, wherein the exhaust gas turbo charging device further comprises a first turbo charging device (6a) with a first turbine (7a) connected to a first compressor via a first compressor shaft (9a), and a second turbo charging device comprising a second turbine (7b) and a second compressor (8b), the second compressor being arranged on a second compressor shaft (9b).

23. The method according to claim 22, wherein the plurality of said different operating modes comprises:
in an operating mode I, driving the first turbo charging device in a single-state supercharging operation at low flow rates;
in an operating mode J, driving the second turbo charging device in a single-state supercharging operation at high flow rates;
in an operating mode K, controlling, with the electrical motor/generator, the rotational speed of the first turbo charging device during a two-state supercharging operation.

24. A control sequence for a hybrid system including an exhaust gas propelled turbo supercharging system, a mechanical supercharging system, and an electrical supercharging/regenerating system, a charging devices and an electric motor/generator, operatively connected to the charging device;
wherein the hybrid system is arranged to operate in different operating modes;
the control sequence being configured for executing of engaging or disengaging the first clutch, second clutch and third clutch (18a, 18b, 18c);
wherein the first clutch (18a) couples a crank shaft of the engine (1) to the electric motor/generator;
wherein the second clutch (18b) couples a planetary gear (25) to the electric motor/generator (20);
wherein the third clutch (18c) connects a power transmission to the crank shaft (4) of the combustion engine (1); and
operating an electric motor (20) in drive mode or generate mode based on a selected operating mode according to the following:

| Mode: | 18a | 18b | 18c | 20 |
|---|---|---|---|---|
| A | Engaged | Disseng. | Disseng. | Drive |
| B | Engaged | Disseng. | Engaged | Drive |
| C | Engaged | N/A | Engaged | Drive |
| D | Engaged | N/A | Engaged. | Generate |

25. The control sequence for a hybrid system according to claim 24, the control sequence being configured for executing of engaging or disengaging the first clutch, second clutch and third clutch (18a, 18b, 18c), operating the electric motor (20) in drive mode or generate mode, opening or closing an air by-pass valve (21), and opening or closing a waste gate (22) of the hybrid system based on a selected operating mode according to the following:

| Mode: | 18a | 18b | 18c | 20 | 21 | 22 |
|---|---|---|---|---|---|---|
| E | N/A | Engaged | N/A | Generate | N/A | N/A |
| F | Engaged | Engaged | Engaged | Generate | N/A | N/A |
| G | Disseng. | Engaged | Engaged | Drive | Closed | N/A |
| H | Engaged | Engaged | Engaged | N/A | Closed | N/A. |

26. The control sequence for a hybrid system according to claim 24, wherein the exhaust gas turbo charging device further comprises a first turbo charging device (6a) with a first turbine (7a) connected to a first compressor via a first compressor shaft (9a), and a second turbo charging device comprising a second turbine (7b) and a second compressor (8b), the second compressor being arranged on a second compressor shaft (9b).

27. The control sequence for a hybrid system according to claim 26, the control sequence being configured for executing of:
engaging or disengaging the first clutch, second clutch and third clutch (18a, 18b, 18c), operating an electric motor (20) in drive mode or generate mode, opening or closing a first and a second air by-pass valve (21a, 21b), and opening or closing a first and a second waste gate (22a, 22b) of the hybrid system based on a selected operating mode according to the following:

| Mode: | 18a | 18b | 18c | 20 | 21a | 21b | 22a | 22b |
|---|---|---|---|---|---|---|---|---|
| I | N/A | N/A | N/A | N/A | Closed | Open | N/A | Open |
| J | N/A | N/A | N/A | N/A | Open | Closed | Open | N/A |
| K | N/A | N/A | N/A | N/A | Closed | Closed | N/A | N/A. |

* * * * *